United States Patent [19]
Jang

[11] Patent Number: 6,129,872
[45] Date of Patent: Oct. 10, 2000

[54] PROCESS AND APPARATUS FOR CREATING A COLORFUL THREE-DIMENSIONAL OBJECT

[76] Inventor: Justin Jang, 2076 S. Evergreen Dr., Auburn, Ala. 36830

[21] Appl. No.: 09/143,734

[22] Filed: Aug. 29, 1998

[51] Int. Cl.[7] .............................. B29C 41/22; B29C 41/52
[52] U.S. Cl. ........................... 264/75; 264/245; 264/255; 264/308; 425/132; 425/145; 425/146; 425/162; 425/375; 700/119
[58] Field of Search .............................. 264/75, 245, 255, 264/308; 425/132, 145, 146, 162, 375; 364/468.26; 700/119

[56] References Cited

U.S. PATENT DOCUMENTS

| | | |
|---|---|---|
| 4,575,330 | 3/1986 | Hull . |
| 4,665,492 | 5/1987 | Masters . |
| 4,752,352 | 6/1988 | Feygin . |
| 4,752,498 | 6/1988 | Fudium . |
| 4,801,477 | 1/1989 | Fudium . |
| 5,121,329 | 6/1992 | Crump . |
| 5,204,055 | 4/1993 | Sachs et al. . |
| 5,303,141 | 4/1994 | Batchelder et al. . |
| 5,340,656 | 8/1994 | Sachs et al. . |
| 5,354,414 | 10/1994 | Feygin . |
| 5,387,380 | 2/1995 | Sachs et al. . |
| 5,398,193 | 3/1995 | de Angelis . |
| 5,402,351 | 3/1995 | Batchelder et al. . |
| 5,435,902 | 7/1995 | Andre . |
| 5,490,882 | 2/1996 | Sachs et al. . |
| 5,555,481 | 9/1996 | Rock et al. . |
| 5,578,227 | 11/1996 | Rabinovich . |
| 5,614,075 | 3/1997 | Andre . |
| 5,617,911 | 4/1997 | Sterett et al. . |
| 5,622,216 | 4/1997 | Brown . |
| 5,637,175 | 6/1997 | Feygin . |
| 5,669,433 | 9/1997 | Sterett et al. . |
| 5,718,951 | 2/1998 | Sterett et al. . |
| 5,738,817 | 4/1998 | Danforth et al. . |
| 5,746,844 | 5/1998 | Sterett et al. . |

*Primary Examiner*—Leo B. Tentoni

[57] ABSTRACT

A process and apparatus for fabricating a colorful three-dimensional object in accordance with a computer aided design (CAD) image of the object. The apparatus includes (a) a supply of one body-building material in filament form; (b) a filament feeding device including one feeding channel and a drive device to drive and regulate the flow of the filament in the channel; (c) a dispensing nozzle having a flow passage communicating with this feeding channel to receive the filament therefrom, a heater for converting a leading portion of the filament to a flowable fluid state, and a discharge orifice to dispense the fluid therethrough; (d) a multi-channel colorant-injecting module including at least one injecting channel in flow communication with the flow passage of the nozzle, at least one colorant reservoir in flow communication with the injecting channel, and control valves to regulate the flow of a colorant therefrom, with the colorant being directed through the injecting channel to mix with a leading portion of the filament for forming a colorant-containing fluid; (e) a platform disposed at a predetermined initial distance from the orifice to receive the colorant-containing fluid discharged therefrom; and (f) motion devices coupled to the platform and the nozzle for moving the nozzle and the platform relative to one another in an X-Y plane and in a Z direction orthogonal to the X-Y plane to deposit the colorant-containing fluid for forming the object. These procedures are automated by a computer system in accordance with the CAD image data files.

23 Claims, 4 Drawing Sheets

PROCESS AND APPARATUS FOR CREATING A COLORFUL THREE-DIMENSIONAL OBJECT

FIELD OF THE INVENTION

This invention relates generally to a computer-controlled object-building process and apparatus and, in particular, to a process and apparatus for depositing colorful objects on a layer-by-layer basis under the control of a data processing system.

BACKGROUND OF THE INVENTION

With the increased use of Computer Aided Design (CAD) solid modeling systems a new frontier of manufacturing technology has emerged that enables translation of the CAD output data into a three-dimensional (3-D) physical object. This technology is commonly referred to as solid freeform fabrication (SFF) or layer manufacturing, which entails building an object on a layer-by-layer and point-by-point basis. Forming objects automatically in three dimensions is useful in verifying CAD database, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, and providing small production runs.

In some of these applications, such as the verification of CAD design and testing of part functionality, the formation of a colorful object may not be considered as essential. In other applications such as aesthetics assessment, however, it may be desirable to have different colors on different parts of an object. Automated SFF systems that are currently available for building three dimensional parts do not provide color manipulating capabilities.

As an example, one commercially available system, stereo lithography (SLy), employs software to slice a computer generated solid model, represented by CAD data, into thin cross sections. The cross sections are then physically created by scanning a spot of ultraviolet laser light over a top surface of a reservoir of photo-curable liquid polymer. The laser beam partially cures the photo-curable material at the scanned spots, changing the material from a liquid to a solid. After forming a given layer an object-supporting platform is lowered within the reservoir by an amount equal to the thickness of the layer created. The scanning process is repeated for the next layer, followed by platform-lowering. These procedures are repeated until all the constituent layers of the object are formed. After fabrication subsequent steps are typically required to drain the unused resin and to fully cure all of the photopolymer that may be trapped within the partially cured material. The SLy systems make use of expensive photo curable polymers to make objects that normally contain difficult-to-clean uncured resin residue. They do not provide the capability for the operator to vary the color of the object.

The following three U.S. patents all teach aspects of 3-D object-building systems based on photo-curable polymers: U.S. Pat. No. 4,563,330, issued Mar. 11, 1986 to Hull, entitled "Apparatus for Production of Three-Dimensional Objects by Stereo lithography"; U.S. Pat. No. 4,752,498, issued Jun. 21, 1988 to Fudium, entitled "Method and Apparatus for Photo solidification"; and U.S. Pat. No. 4,801, 477, issued Jan. 31, 1989 to Fudium, entitled "Method and Apparatus for Production of Three-Dimensional Objects by Photo solidification".

In another type of commercially available system, selective laser sintering (SLS), a thin layer of heat-fusible powder is spread over a surface by a counter rotating cylinder. A laser is employed to scan the powder layer, while its beam is modulated to melt the powder only in areas defined by the geometry of the cross section. A new layer of powder is then spread and melted, and the process is continually repeated until the part is completed. In general, the sintering systems are relatively expensive and require a significant amount of time to generate a finished part of average complexity from the input CAD data. Furthermore, the current SLS systems are not capable of generating an object with different colors at different locations of the object.

In a series of U.S. patents (U.S. Pat. No. 5,204,055, April 1993, U.S. Pat. No. 5,340,656, August 1994, U.S. Pat. No. 5,387,380, February 1995, and U.S. Pat. No. 5,490,882, February 1996), Sachs, et al. disclose a 3-D printing technique that involves using an inkjet to spray a computer-defined pattern of liquid binder onto a layer of powder. Another layer of powder is spread over the preceding one, and the process is repeated. The "green" part is separated from the loose powder when the process is completed. This procedure is followed by powder removal and metal melt impregnation or sintering. In another series of U.S. patents (U.S. Pat. No. 4,752,352, June 1998, U.S. Pat. No. 5,354, 414, October 1994, U.S. Pat. No. 5,637,175, June 1997), Feygin report a technique called laminated object manufacturing (LOM). In this technique, a material delivered in a thin sheet form, coated with thermally activated adhesive, is glued to the previous layer by use of a heated roller. A laser outlines a CAD-defined cross section onto the sheet and, in nonsolid (unwanted) areas of the layer, it scribes a cross-hatch pattern of small squares. As the procedures repeat, the cross-hatches build up into "tiles," which are broken off the solid block to yield a finished part. Both 3-D inkjet printing and LOM methods, in their present forms, do not permit adjustable-color fabrication of an object.

The following U.S. patents are related to computer-controlled fabrication of three dimensional objects. In U.S. Pat. No. 4,665,492, issued May 12, 1987, entitled "Computer Automated Manufacturing Process and System" Masters teaches part fabrication by spraying drops or particles, a process commonly referred to as Ballistic Particle Modeling (BPM). In a series of patents (U.S. Pat. No. 5,746,844, May 1998, U.S. Pat. No. 5,718,951, February 1998, U.S. Pat. No. 5,669,433, September 1997, and U.S. Pat. No. 5,617,911, April 1997), Sterett, et al. disclose a method and apparatus for building metal objects by supplying, aligning and depositing nearly uniform metal melt droplets. In U.S. Pat. No. 5,398,193, issued Mar. 14, 1995, entitled "Method of 3-D Rapid Prototyping Through Controlled Layerwise Deposition/Extraction and Apparatus Therefor," de Angelis teaches a method that involves combined material additive and material subtractive procedures to build every constituent layer of an object. Andre teaches a method of incremental object fabrication in two U.S. Pat. No. 5,435,902, July 1995 and U.S. Pat. No. 5,614,075, March 1997. Brown discloses a method and apparatus for metal solid preform fabrication utilizing partially solidified metal slurry (U.S. Pat. No. 5,622,216, April 1997). Rock and Gilman reveal a method of producing a solid object using two distinct classes of materials, one material to form the object while the other material to form a complementary-shaped support that is later removed (U.S. Pat. No. 5,555,481, September 1996). In U.S. Pat. No. 5,578,227, November 1996, Rabinovich teaches a rapid prototyping system that involves drawing and positioning thin, continuous feedstock of materials which have various profiles with opposite flat sides and fusing the feedstock by welding a flat side with a laser beam to a flat side of a previous layer, while keeping the feedstock cross section in substantially original shape.

Another commercially available system, fused deposition modeling (FDM), employs a heated nozzle to extrude a melted material such as a nylon wire or a wax rod. The starting material is in the form of a rod or a filament, the latter being supplied from a spool. The filament is introduced into a flow passage of the nozzle and is driven to move like a piston inside this flow passage. The front end, near the nozzle tip, of this piston is heated to become melted; the rear end or solid portion of this piston pushes the melted portion forward to exit through the nozzle tip. The nozzle is translated under the control of a computer system in accordance with previously generated CAD data sliced into constituent layers. The FDM technique was first disclosed in U.S. Pat. No. 5,121,329 (1992), entitled "Apparatus and Method for Creating Three-Dimensional Objects," issued to S. S. Crump. The primary applications of this FDM technique have been the fabrication of prototypes and the creation of positive forms to be utilized in investment casting processes. The users of the FDM technology have heretofore been concerned primarily with the dimensional accuracy and surface finish of the final part. Little attention has been paid to the formation of a color pattern on the surface or inside the body of the final part.

A most recent patent (U.S. Pat. No. 5,738,817, April 1998, to Danforth, et al.) reveals a fused deposition process for forming 3-D solid objects from a mixture of a particulate composition dispersed in a binder. Fine ceramic and metallic powders were employed as the primary particulate component for making ceramic and metal parts, respectively. The binder is later burned off with the remaining particulate composition densified by re-impregnation or high-temperature sintering. This patent emphasizes the mechanical integrity of a part and again has paid little attention to the color form of a part. Batchelder, et al. (U.S. Pat. No. 5,402,351, 1995 and U.S. Pat. No. 5,303,141, 1994) reveal a model generation system having closed-loop extrusion nozzle positioning. These melt extrusion based deposition systems provide only a fixed-composition feed and do not lend themselves to varying the color of an object.

Therefore, an object of the invention is to provide a layer manufacturing process and apparatus for producing a colorful 3-D object.

It is a specific object of the invention to provide a process and apparatus for producing a multi-color object from a computer-aided design image of the object.

It is a further object of the invention to provide a computer-controlled object fabrication process and apparatus with which the color pattern of an object can be varied during the object-building process.

It is still another object of the invention to provide methods and apparatus for generating a CAD-defined object in which the color pattern can be predetermined.

SUMMARY OF THE INVENTION

The foregoing and other problems are overcome and the objects of the invention are realized by a process and apparatus for fabricating a colorful three-dimensional object preferably in accordance with a CAD-generated image of the object and under the control of a computer.

As a first embodiment of the present invention, the apparatus includes (a) supply of at least one primary body-building material in filament form; (b) a filament-feeding device comprising one filament feeding channel and drive means such as motors to drive and regulate the flow of the filament material in the feeding channel; (c) a dispensing nozzle having a flow passage communicating with this feeding channel to receive the filament material therefrom, heating means for converting a leading portion of the filament material to a flowable fluid state, and a discharge orifice to dispense the fluid therethrough; (d) a multi-channel colorant-injecting module comprising at least one injecting channel in flow communication with the flow passage of the nozzle, at least one reservoir for a colorant in flow communication with the injecting channel, and valve means in control relation to the injecting channel to regulate the flow of the colorant therefrom; the injecting channel directing the colorant to mix with a leading portion of the filament material for forming a colorant-containing fluid; (e) an object-supporting platform in close, working proximity to the discharge orifice to receive the colorant-containing fluid discharged therefrom; and (f) motion devices coupled to the platform and the nozzle for moving the nozzle and the platform relative to one another in an X-Y plane defined by first and second directions (or X and Y directions) and in a third direction (Z direction) orthogonal to the X-Y plane to deposit the colorant-containing fluid into a three-dimensional object.

The supply of filament may comprise a rotatable spool on which the filament is wound. An alternative version of this embodiment contains a supply of a primary body-building material delivered in a generally elongated rod form with a relatively uniform cross section rather than in a filament form.

Another embodiment of the present invention is an apparatus similar to the above-described one with the exception that the incoming primary body-building material, a filament or elongated rod, is made to become a flowable fluid state at its leading portion by introducing a carrier liquid that can dissolve or disperse the body-building material. This can be achieved by having a liquid-supplying reservoir and a pipe that deliver a selected liquid (water or organic solvent) to the flow passage of the nozzle. This liquid will act to dissolve or disperse a leading portion of the incoming rod or filament.

The above-described apparatus preferably further comprises (g) a computer-aided design computer and supporting software programs operative to create a three-dimensional image of a desired object, to convert the image into a plurality of segments defining the object, and to generate programmed signals corresponding to each of these segments in a predetermined sequence; and (h) a three-dimensional motion controller electronically linked to the motion devices and operative to actuate the motion devices in response to the programmed signals for each segment received from the computer.

Preferably, the computer and supporting software programs are capable of accepting previously created solid modeling data files (produced by a different computer, e.g.) expressed in terms of a plurality of segments defining a desired object and also capable of generating programmed signals corresponding to each of these segments in a predetermined sequence.

Further preferably, the supporting software programs comprise some ways for evaluating the data files of the object to locate any un-supported feature of the object and, if an un-supported feature exists, for defining a support structure for the un-supported feature. The support structure is then defined in terms of a plurality of segments and the software programs are further operated for generating programmed signals required by the dispensing nozzle, or a separate fabrication tool, to fabricate the support structure.

Another embodiment of the present invention is a solid freeform fabrication process for building a colorful three-dimensional object comprising the steps of (1) providing a supply of at least one primary body-building material in filament form; (2) feeding each filament material to enter one end of a flow passage of a dispensing nozzle having a discharge orifice on another end; (3) operating a multi-channel colorant-injecting module to inject a first colorant-containing material into the flow passage through a pipe disposed in close proximity to the discharge orifice; (4) operating the dispensing nozzle to convert a leading portion of the filament material therein to a flowable fluid which mixes with the first colorant-containing material for forming a first colorant-containing fluid, and to dispense the colored fluid through the discharge orifice to an object-supporting platform; and (5) during this dispensing step, moving the nozzle and the platform relative to one another in an X-Y plane defined by an X- and Y-directions and in a Z-direction orthogonal to the X-Y plane to form the colored fluid into a three-dimensional object.

Preferably the above moving step includes the steps of (A) moving the nozzle and the platform relative to one another in a direction parallel to the X-Y plane to form a first layer of the first colorant-containing material on the platform; (B) moving the nozzle and the platform away from one another in the Z-direction by a predetermined layer thickness; and (C) after the portion of the first layer adjacent to the nozzle has solidified, dispensing a second layer of the first colorant-containing fluid onto the first layer while simultaneously moving the platform and the nozzle relative to one another in a direction parallel to the X-Y plane, whereby the second layer solidifies and adheres to the first layer. Preferably, this procedure is followed by additional steps of forming multiple layers of the first colorant-containing material on top of one another by repeated dispensing of the material from the nozzle as the platform and said nozzle are moved relative to one another in the direction parallel to the X-Y plane, with the nozzle and the platform being moved away from one another in the Z direction by the predetermined layer thickness after each preceding layer has been formed, and with the dispensing of each successive layer being controlled to take place after the material in the preceding layer immediately adjacent the nozzle has solidified. This process can be used to make a single-color object.

Another embodiment is a process comprising the above five steps, (1) through (5), wherein the moving step includes the steps of (D) moving the nozzle and the platform relative to one another in a direction parallel to the X-Y plane to form first portion of a first layer with the first colorant-containing material on the platform, injecting a second colorant-containing material into the flow passage of the nozzle to mix with the leading portion of the filament material to form a second color fluid, and dispensing the second color fluid to form a second portion of the first layer; these procedures being repeated until a multi-color first layer is built; (E) moving the nozzle and the platform away from one another in the Z direction by a predetermined layer thickness and after the portion of the first layer adjacent the nozzle has solidified, dispensing a second layer of selected colored fluids onto the first layer while simultaneously moving the platform and the nozzle relative to one another in a direction parallel to the X-Y plane, whereby the second layer solidifies and adheres to the first layer; and (F) forming multiple layers of colored materials on top of one another by repeated dispensing of colored fluids, in such a fashion that one color fluid is dispensed for a portion of a layer, from the nozzle as the platform and the nozzle are moved relative to one another in the direction parallel to the X-Y plane, with the nozzle and the platform being moved away from one another in the Z direction by the predetermined layer thickness after each preceding layer has been formed, and with the dispensing of each successive layer being controlled to take place after the materials in the preceding layer immediately adjacent the nozzle has solidified. This process can be employed to make a multi-color object in which each layer may be composed of several portions of different colors and different layers may have different color patterns.

Another embodiment is a process comprising the above five steps, (1) through (5), wherein the moving step includes the steps of (G) moving the nozzle and the platform relative to one another in a direction parallel to the X-Y plane to form a first layer of the first colorant-containing material on the platform; (H) moving the nozzle and the platform away from one another by a predetermined layer thickness and after the portion of the first layer adjacent to the nozzle has solidified, injecting a second colorant-containing material into the flow passage of the nozzle to mix with the leading portion of the filament material to form a second color fluid, and dispensing the second color fluid to form a second layer onto the first layer while simultaneously moving the platform and the nozzle relative to one another in a direction parallel to the X-Y plane, whereby the second layer solidifies and adheres to the first layer; and (I) forming multiple layers of colorant-containing materials on top of one another by repeated dispensing of colored materials, one colorant-containing material for one layer, from the nozzle as the platform and the nozzle are moved relative to one another in a direction parallel to the plane, with the nozzle and the platform being moved away from one another in the Z direction by the predetermined layer thickness after each preceding layer has been formed, and with the dispensing of each successive layer being controlled to take place after the material in the preceding layer immediately adjacent the nozzle has solidified. This process can be utilized to fabricate a multi-color object in which individual layers could have different colors and each layer is of one color.

The above-described processes may be advantageously subjected to computer control. This can be accomplished by taking, for instance, the following additional steps: (J) creating an image of the three-dimensional object on a computer with the image including a plurality of segments defining the object; (K) generating programmed signals corresponding to each of these segments in a predetermined sequence; and (L} moving the nozzle and the platform relative to one another in response to these programmed signals. Preferably, in Step (J), each segment corresponding to one portion of a layer is coded with a color and the color code is inserted as a part of the programmed signals. These signals will be used to operate and control the multi-channel colorant-feeding module and the nozzle to dispense selected colored fluids with one color fluid being dispensed for each of the segments.

Another embodiment of the invention is a process as specified in steps (1) through (5), wherein the moving step includes the step of moving the dispensing nozzle and the platform relative to one another in a direction parallel to the X-Y plane according to a first predetermined pattern to form an outer boundary from at least one selected color fluid on the platform with the outer boundary defining an exterior surface of the object. Since this outer boundary defines an interior space in the object, this moving step may further include the step of moving the dispensing nozzle and the platform relative to one another in a direction parallel to the X-Y plane according to at least one other predetermined pattern to fill this interior space with at least one of the color fluids. These procedures can be controlled by a computer by following similar procedures described above, including creating a plurality of color-coded segments, etc.

As preferred embodiments of this invention, each one of the above computer-controlled processes also includes the steps of identifying any un-supported feature of an object, such as an isolated island or an overhang, creating layer data files for a support structure, and generating necessary programmed signals with which the same nozzle or a separate fabrication tool can be used to build the support structure.

DESCRIPTION OF THE PREFERRED EMBODIMENTS

Figure 1:
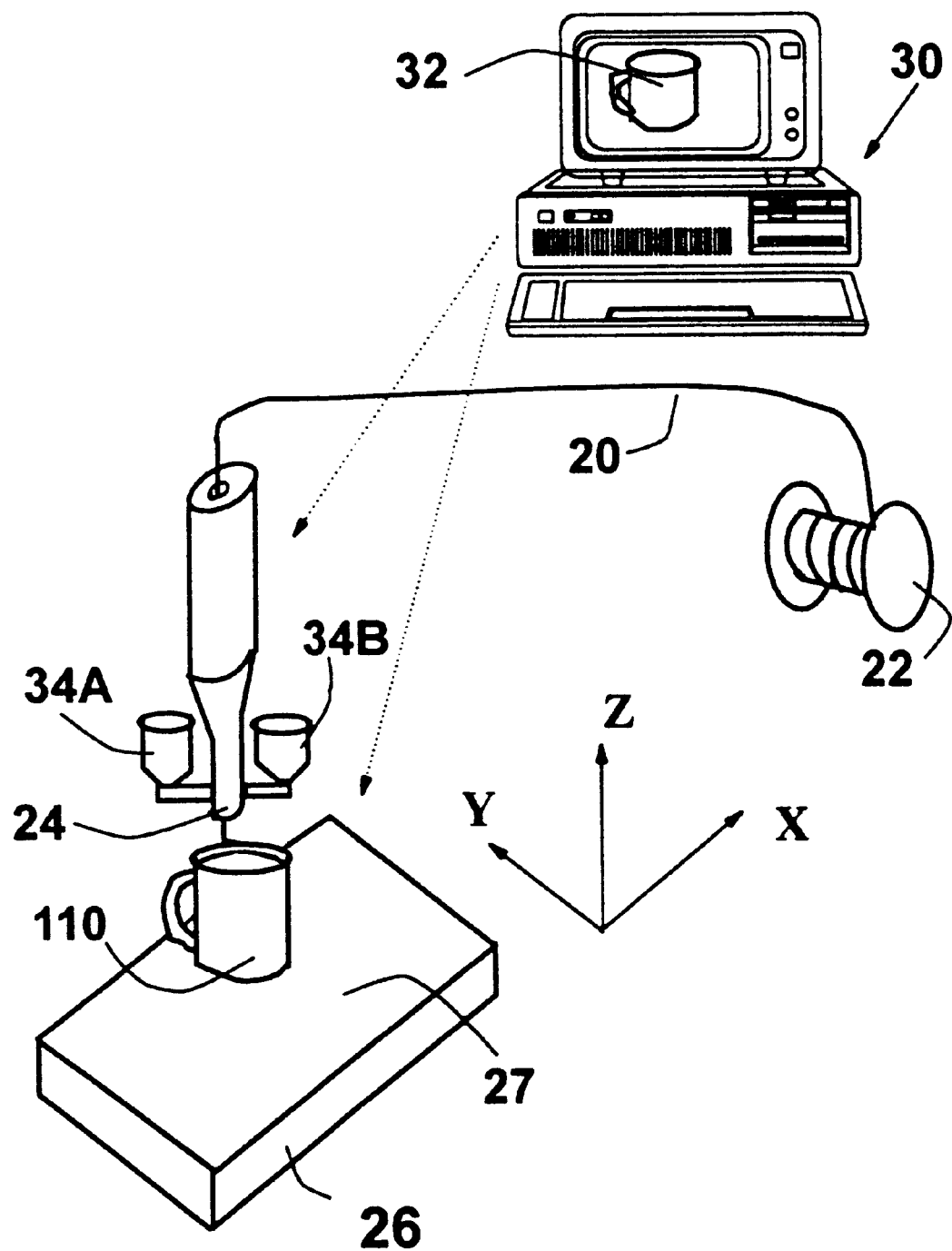
FIG. 1 is a diagrammatic view showing the apparatus for making a colorful three-dimensional object on a layer-by-layer basis.
Figure 2:
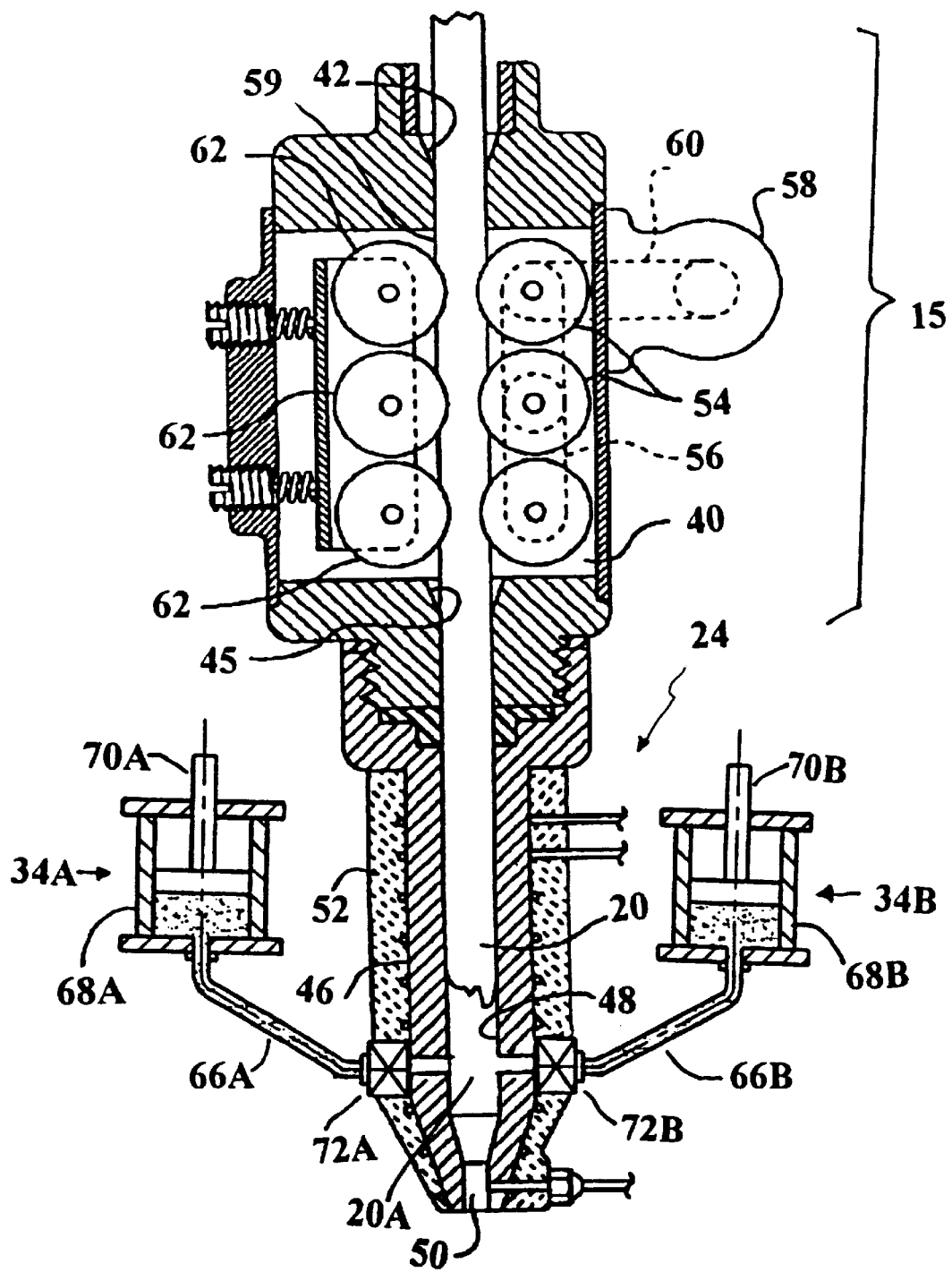
FIG. 2 is a schematic cross-sectional view of an embodiment of the dispensing nozzle used in the present freeform fabrication process.

As schematically shown in FIG. 1 and FIG. 2, an embodiment of the presently invented apparatus includes a supply (e.g., a filament spool 22) of one primary body-building material 20 in filament form. The filament feeds through an upper inlet aperture 42 of a chamber 40 in a filament feeding device 15. Included in this chamber is a filament feeding channel 59 (shown to accommodate the filament 20) and drive means. An example of drive means comprises a plurality of drive rollers 54 connected to one another by a suitable belt or chain drive 56 and driven simultaneously by a stepper motor 58 and a drive belt or chain 60. A plurality of idler rollers 62 located opposite to drive rollers 54 may work together therewith to grip the filament 20 therebetween and to advance it through a dispensing nozzle 24 toward the discharge orifice 50 of the nozzle.

A dispensing nozzle 24 is disposed in close proximity to the filament feeding device 15. In FIG. 2, the nozzle is shown to be intimately connected to the filament-feeding device. The nozzle has a flow passage 48 communicating with the feeding channel 59 through a lower aperture 45 of the chamber 40 to receive the filament material therefrom. Heating means (in the form of a resistance heating tape or sleeve 52) is positioned around the lower portion 46 of the nozzle 24 for converting a leading portion 20A of the filament material to a flowable fluid state. The solid (un-melted) portion of the filament inside the feeding channel 59 acts like a piston to drive the melted liquid for dispensing through the discharge orifice 50. The drive motor can be controlled to regulate the advancing rate of the filament 20 in the feeding channel so that the volumetric dispensing rate of the fluid can be closely controlled.

A multi-channel colorant-injecting module is disposed in the vicinity of the lower portion 46 of the nozzle. Only two of the channels for such a module are shown, as an example, in FIG. 2. The module comprises two injecting channels 66A,66B in flow communication with the flow passage 48 of the nozzle, two colorant reservoirs 68A,68B in flow communication with their respective injecting channels, and valve means 72A,72B to regulate the flow of the colorant therefrom. The colorants or colorant-containing materials flow through the injecting channels to mix with a leading portion 20A of the filament material for forming a colorant-containing fluid. The two reservoirs 68A,68B, may be advantageously provided with pressurizing means (pistons 70A,70B along with necessary drive means, not shown) to facilitate feeding of colorants into the flow passage of the nozzle. It is to be understood that there are a wide variety of commercially available liquid or powder injecting devices (e.g., syringes and liquid dispensers, etc.). They can be adapted for use in the present apparatus to replace the two feeding devices 34A,34B shown herein in FIG. 1 and FIG. 2.

The colorant-containing fluid, or color fluid, is eventually discharged through the orifice 50 onto a generally flat object-supporting platform 26 in close, working proximity to the discharge orifice. Motion devices are coupled to the platform and the nozzle for moving the nozzle and the platform relative to one another in an X-Y plane defined by first and second directions (or X and Y directions) and in a third direction (Z direction) orthogonal to the X-Y plane to deposit the colorant-containing fluid into a three-dimensional object.

As shown in FIG. 1, the filament may be continuously supplied from a rotatable spool 22 on which the filament is wound. However, a primary body-building material may be delivered in a generally elongated rod form with a relatively uniform cross section rather than in a filament form. The rod can be driven to advance by a similar combination of rollers, belts or chains, and motors.

Figure 3:
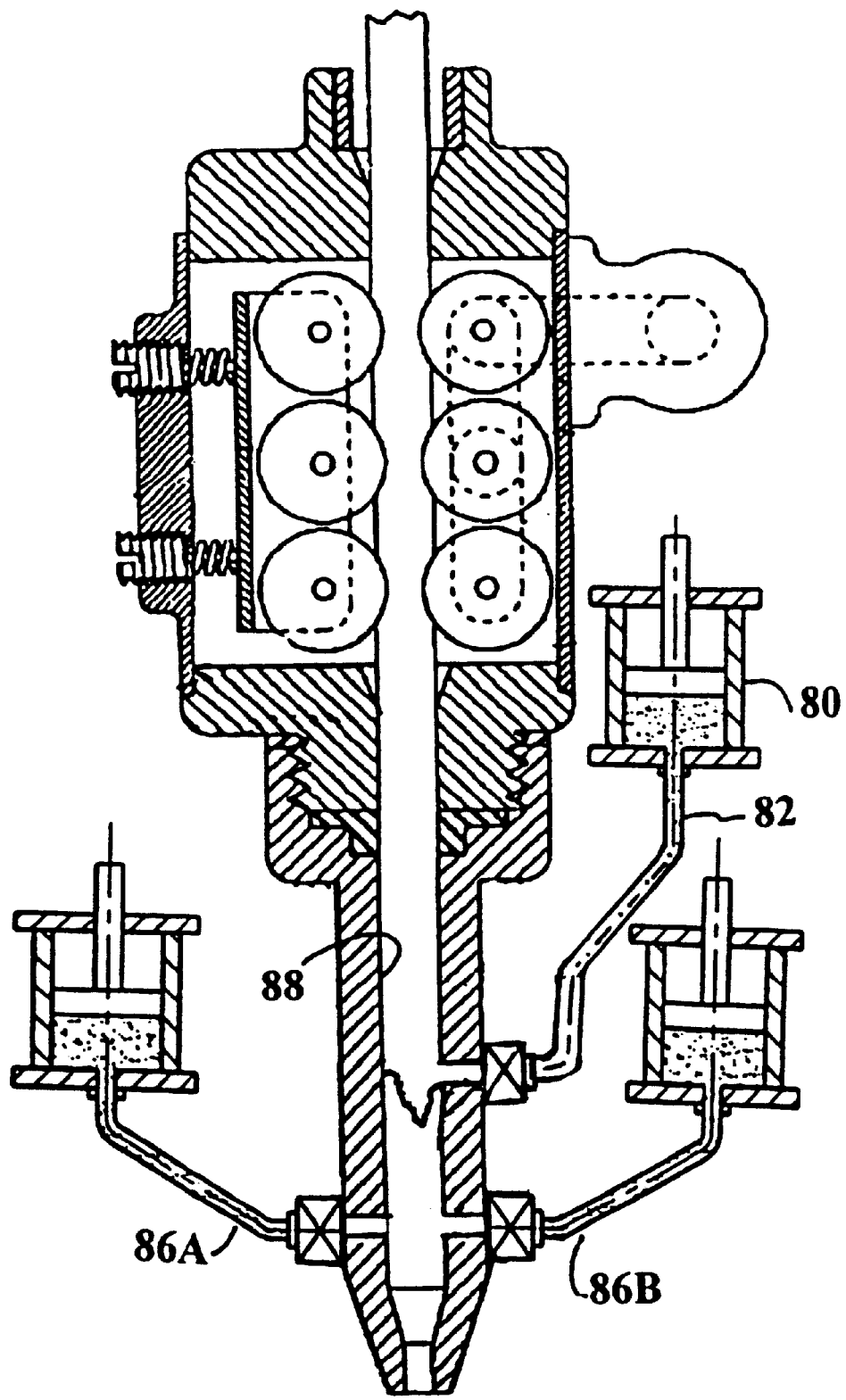
FIG. 3 is a schematic cross-sectional view of another dispensing nozzle in which a liquid is introduced to bring the leading portion of a filament or rod in the nozzle flow passage to a flowable fluid state.

Another embodiment of the present invention is an apparatus similar to the above-described one with the exception that the incoming primary body-building material, a filament or elongated rod, is made to become a flowable fluid state at its leading portion by introducing a carrier liquid that can dissolve or disperse the material. This can be achieved by having a liquid-supplying reservoir 80 and pipe 82 to deliver a selected liquid (water or organic solvent) at a predetermined rate to the flow passage 48 of the nozzle. Referring to FIG. 3, this liquid-feeding pipe 82 is preferably located at a position of the nozzle flow passage further upstream from where the colorant-injecting channels 68A,68B meet the flow passage. In this case, heating provision may no longer be a requirement.

As an example, a water-soluble material such as poly (ethylene oxide), in a flexible filament or rod form, may be allowed to feed into the nozzle flow passage along with a predetermined amount of water to form a flowable solution or paste. Some materials (e.g., plaster and starch) may be dispersed, but not completely dissolved, in water or another type of non-toxic liquid. These types of materials may also be fed into the flow passage along with water or a proper liquid to make a paste. The fluid, in solution or paste form in the passage 48, is then pushed by the solid portion of the rod or filament in the feeding chamber 40 to move through the discharge orifice.

It may be noted that the colorant-injecting channels 66A,66B are located in the immediate vicinity of the discharge orifice 50. This arrangement permits a fast change-over from one color to another and represents a desirable situation if mixing of colorants is not required. If, on the contrary, a colorant is introduced way upstream from the discharge orifice, then it will take some time for a fluid containing this colorant to be completely discharged. This will delay the step of switching over to another color and quite possibly prolong the transition period of time during which mixing of colorants takes place. In a commercially available fused deposition system (e.g., FDM-2000 from Stratasys, Inc. Minneapolis, Minn.), only a single filament is introduced into a nozzle to build the object. No colorant-injecting device is provided for making a colorful object. In principle, as indicated in U.S. Pat. No. 5,121,329, a FDM nozzle could possibly comprise a plurality of flow passages communicating with a single channel leading to a discharge orifice, with each flow passage being used for receiving a separate filament from a multi-filament supplier. Conceivably, these separate filaments could contain different colorants therein. In such a design, however, a change-over from one color to another will not be easily accomplished and will take an excessively long time to complete, allowing undesirable mixing of colorants to occur inside the channel before being discharged from the orifice.

The primary body-building material may be comprised of, but is not limited to, one or more of the following materials including various waxes, thermoplastic polymers, thermoset polymers, metallic alloys, glasses, ceramics, and combinations thereof. The material may also include combinations containing dissimilar materials added to impart a desired electrical, structural, or other functional characteristic to the material. Any material that can be made into a rod or continuous filament form and can be made to become a flowable fluid (melt, solution, paste, etc.) in which a colorant can be readily dispersed can be a candidate body-building material. However, the primary body-building material preferably comprises an organic polymer with a reasonably low softening or melting point, e.g., acrylonitrile-butadiene-styrene (ABS).

A color-making ingredient (referred to as a colorant) may be a dye, pigment, color concentrate (commonly used in coloring of plastics), or combinations thereof. Preferably, the colorants or colorant-containing materials in the reservoirs are in either a fluid form or fine powder form. Advantageously, at least one of the reservoirs contains a white colorant and another one contains a black colorant. Further advantageously, at least one reservoir contains a yellow colorant, a second reservoir contains a blue colorant, and a third reservoir contains a red colorant.

Figure 4:
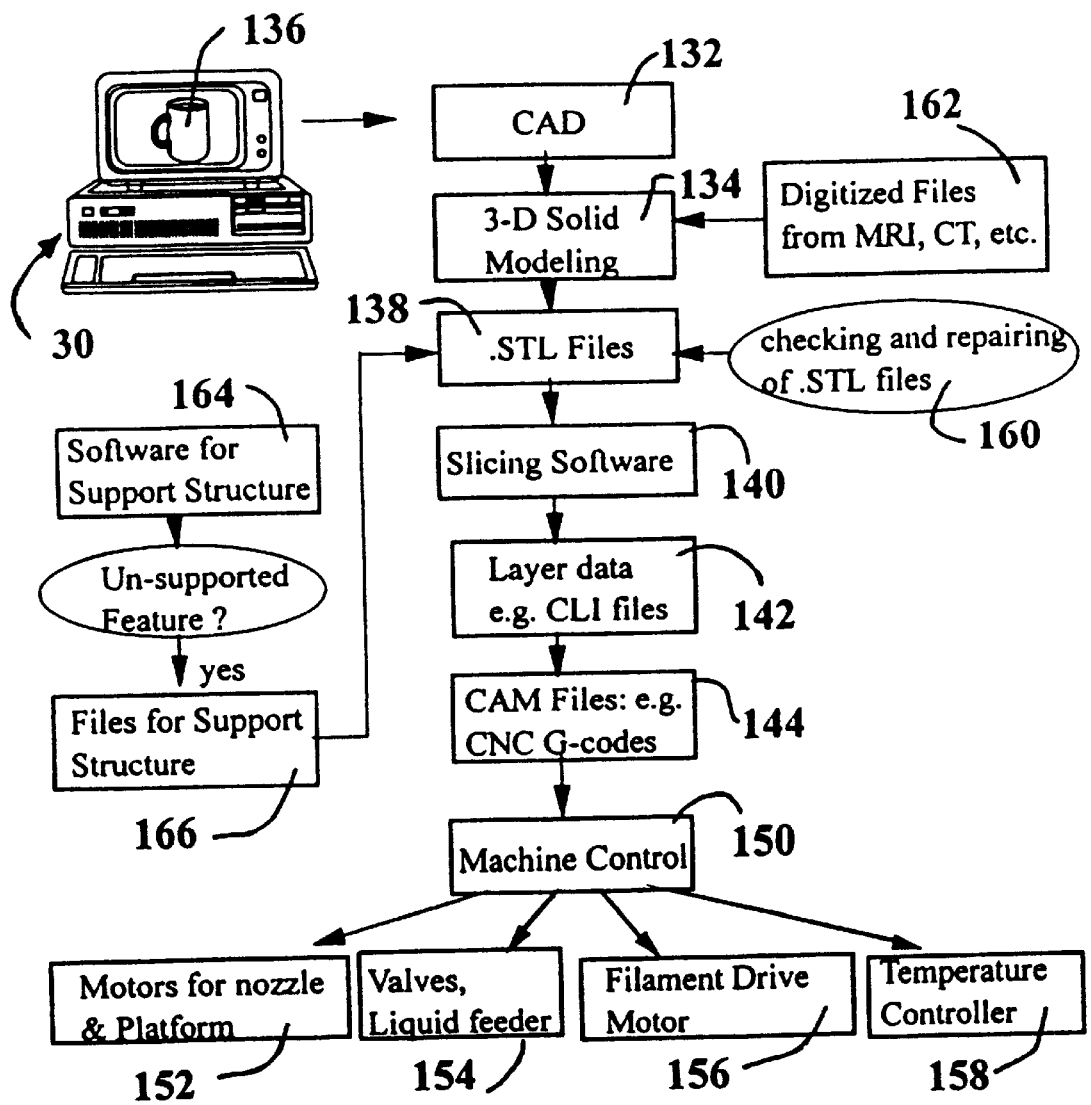
FIG. 4 schematically shows a computer-aided design (CAD) computer and required software programs for creating an image of the object being built, for optionally generating data files for support structures, and for controlling various components of the 3-D color object building apparatus.

Referring to FIG. 1 and FIG. 4, the above-described apparatus preferably further comprises a computer-aided design computer 30 and supporting software programs and data files 132,134,138,140,142,144 operative to create a three-dimensional image of a desired object, to convert the image into a plurality of segments defining the object, and to generate programmed signals corresponding to each of these segments in a predetermined sequence. Preferably, the computer and supporting software programs are capable of accepting previously created solid modeling data files (produced by a different computer in a proper format, e.g.) expressed in terms of a plurality of segments defining a desired object and of generating programmed signals corresponding to each of these segments in a predetermined sequence. The apparatus should preferably also include a machine controller 150 electronically linked to the movement devices 152, filament-driving motors 156, colorant-injecting valves 154, and possibly liquid-feeding mechanism, if any. The controller is controlled by the computer to actuate the movement devices, valves, and feeding mechanisms in response to the programmed signals for each segment received from the computer. Temperature controllers 158, if needed, may also be subject to the computer control.

Further preferably, the supporting software programs 164 comprise some ways for evaluating the data files of the object to locate any un-supported feature of the object and, if an un-supported feature exists, for defining a support structure for the un-supported feature. The support structure is then defined in terms of a plurality of segments 166 and the software programs are further operated for generating programmed signals required by the dispensing nozzle, or a separate fabrication tool, to fabricate said support structure.

Advantageously, the dispensing nozzle may be so designed that the tip can be readily removed and replaced with another tip of a different size. The fluidized material goes through a passage of the nozzle and eventually exits from the orifice of the nozzle to deposit onto either the surface 27 an object-supporting platform 26 or a previously formed layer of the object 110 on the platform. Optional heating and cooling provisions (e.g., heating elements, cooling tubes, thermocouple, and temperature controller; not shown) may be provided to the platform region to control the solidification behavior of the material.

Referring again to FIG. 1, the object platform 26 is located in close, working proximity to the dispensing nozzle 24. The upper surface 27 of the platform preferably has a flat region sufficiently large to accommodate the first few layers of the deposited material. The platform and the nozzle are equipped with mechanical drive means for moving the platform relative to the dispensing nozzle in three dimensions along the X-, Y-, and Z-axes in a rectangular coordinate system in a predetermined sequence and pattern, and for displacing the nozzle a predetermined incremental distance relative to the platform. This can be accomplished, for instance, by allowing the platform to be driven by three linear motion devices, which are powered by three stepper motors to provide movements along the X-, Y-, and Z-directions, respectively. Motor means are preferably high resolution reversible stepper motors, although other types of drive motors may be used, including linear motors, servomotors, synchronous motors, D.C. motors, and fluid motors. Mechanical drive means including linear motion devices, motors, and gantry type positioning stages are well known in the art.

Z-axis movements are effected to displace the platform relative to the nozzle or to displace the nozzle relative to the platform and, hence, relative to each layer deposited prior to the start of the formation of each successive layer. In one possible arrangement, the nozzle and other hardware attached to the nozzle may be mounted in a known fashion for movement in the X-Y plane, with the platform supported for separate movement toward and away from the nozzle along the Z-direction. Alternatively, the platform may be supported for movement in the X-Y plane, with the nozzle mounted for separate movement along the Z-direction toward and away from the platform. Another alternative is to have the movements in the X-Y plane and in the Z-direction all to be carried out by either the platform only or by the nozzle only. It will be understood that movement in the X-Y plane need not be limited to movement in orthogonal directions, but may include movement in radial, tangential, arcuate and other directions in the X-Y plane.

These movements will make it possible for the nozzle to deposit and form multiple layers of colorant-containing materials of predetermined thickness, which build up on each other sequentially as the material solidifies after discharge from the orifice. The rate at which the fluidized material is discharged from the discharge orifice onto the platform is dictated by the speed of the motor drive in the filament- or rod-feeding module. This speed can be adjusted, by varying the motor rotational speed, to meet the possible needs of variable rate at which the nozzle moves with respect to the platform.

The discharged fluid that comes in contact with the object platform or a previous layer must meet two conditions. The first condition is that this material must have a sufficiently high viscosity to prevent excessive flow when being deposited; this is required in order to achieve good dimensional accuracy. The second condition is that the newly discharged material must be able to well adhere to a previous layer. These two conditions can be met by discharging the following six types of materials under a specified condition:

Type I: A ceramic, metallic, wax, or semi-crystalline polymer material must be maintained at a temperature slightly above its melting point just before being discharged. The object platform and the previous layers must be maintained at a temperature lower than its melting temperature. The portion of the previous layer facing the nozzle must have been solidified before the new material is brought in contact with this portion of the previous layer. Examples of semi-crystalline polymers are polyamide (or nylon), poly (ethylene terephthalate) (PET), and polypropylene (PP).

Type II: A non-crystalline material such as glass (e.g., boro-silicate glass and soda-lime-silica glass) and amorphous thermoplastic polymer material must be maintained at a temperature slightly above its glass transition point just before being discharged. The object platform and the previous layers must be maintained at a temperature lower than its glass transition temperature. The portion of the previous layer facing the nozzle must have been solidified before the new material is brought in contact with this portion of the previous layer. Examples of substantially amorphous thermoplastic polymers are polystyrene (PS), acrylonitrile-butadiene-styrene copolymer (ABS), poly methyl methacrylate (PMMA), and poly carbonate (PC).

Type III: A liquid-soluble material (e.g., water soluble polymer) must be maintained at a solution state with a high solute content (low percentage of liquid). The object platform and the previous layers must be maintained at a temperature lower than (preferably much lower than) the freezing temperature of the liquid so that the new material when brought in contact with a previous layer is rapidly frozen. Upon completion of the object-building procedure, the frozen object is then subjected to a vacuum environment, or under a pumping condition, to promote sublimation of the "solvent" component (i.e., the "liquid" component now in its solid state). This is essentially a freeze-drying procedure well known in the food processing industry. Upon completion of this freeze-drying procedure, the object will be highly porous and may be impregnated with a material such as a wax or epoxy resin for improved integrity.

Type IV: A solid material (e.g., ceramic, metallic, or polymeric powder) that can be dispersed (mixed but not dissolved) in a liquid is made into a paste of proper viscosity and preferably of high solid content. Preferably, the liquid is a fast vaporizing one such as ethanol, methanol, and acetone; a non-toxic material (e.g., alcohol) having a high vapor pressure at room temperature is most desirable. The part-building zone surrounding the object platform is preferably under a vacuum or pumping condition to promote vaporization of the liquid, rapidly leaving behind the solid. A lower temperature environment may be desired for reduced flowability of the paste. Alternatively, a freeze-drying procedure may be followed to remove the liquid component.

Type V: A fast-curing thermosetting resin (e.g., a two-part epoxy) may be maintained in an oligomer state prior to being discharged. As soon as being dispensed, the resin will rapidly gel to an extent that the glass transition temperature of this reacting resin quickly approaches or exceeds the object platform environment temperature, thereby solidifying the resin. The gelation process of selected resins, e.g., some photo curable epoxy resins commonly used in stereo lithography, may be further accelerated by exposing the deposited resin to an ultraviolet beam. Fast curing resins are well known in the art and several formulations are commercially available.

Type VI: A sol-gel material (e.g., a polymer gel composed of a lightly cross-linked network of chains with small molecules occupying interstices between these chains) can be formulated to have proper flowability prior to being discharged from a nozzle. The gelation process of the material when brought in contact with the object platform or a previous layer may be rapidly advanced further to increase its viscosity to facilitate solidification. A variety of natural polymer powders, such as lotus root and corn starch, may be well dispersed in warm water to produce paste for being readily transported to a nozzle. Additional water at a higher temperature is then added just prior to the discharging step to activate the fast gelation process. The new material will naturally glue to a previous layer, yet will not flow to any significant extent in this highly gelled state. Synthetical polymers such as polyacrylamide also has exhibited a similar behavior and has been found to successfully make a 3-D gel object.

As another embodiment of the present invention, the apparatus is similar to any of the above-defined apparatus, but with the difference that this apparatus comprises a plurality of nozzles. Each additional nozzle is provided with a separate supply of body-building materials. Each additional nozzle may be in flow-communication with more than one colorant-feeding channel. Each nozzle may take turn to deposit a material of a different color to build a portion of the object. A support structure may be built to support an unsupported feature (e.g., the bottom part of a cup handle).

Another embodiment of the present invention contains a multiple-nozzle apparatus. However, at least one separate nozzle is supplied with a low-melting material (e.g., wax) so that this nozzle is operative to discharge and build a support structure for any un-supported feature in the three-dimensional object being built. Un-supported features in an object include isolated islands, overhangs, and some suspended members of the object. There are many commercially available metering and dispensing nozzles that are capable of depositing wax and various resins such as epoxy and polyurethane. Examples include various two-component dispensing devices such as PosiDot$^R$ from Liquid Control Corp. (7576 Freedom Ave., North Canton, Ohio) and Series 1125 Meter-Mix-Dispense systems from Ashby-Cross Company, Inc. (418 Boston Street, Topsfield, Mass.). Any of such prior art dispensing nozzles can be incorporated as a part of the presently invented apparatus to deposit a resin or wax when and where needed. It may also be noted that these liquid dispensing devices may be adapted for injecting colorants or colorant-containing materials into the flow passage of the nozzle to mix with the primary body-building material therein.

In either a single-nozzle or multiple-nozzle system described above, the part building zone surrounding the object platform is preferably provided with heating means, cooling means, or both. Heating means are desirable for allowing a part-building material (e.g., ABS plastic) to solidify at a desired temperature; different materials requiring different solidification temperatures. Cooling means are desirable when the dispensed fluid is a liquid solution, a paste, or a polymer gel. As discussed earlier, some of these compositions may have to go through a freeze-drying procedure. An inert atmosphere may be needed to limit the oxidation behavior of a metal if a metal melt is being dispensed.

A preferred embodiment of the present invention contains any fluid delivering and dispensing apparatus as previously described in this section, but further comprising a computer-aided design (CAD) computer 30 and a machine controller 150. As schematically shown in FIG. 4, the CAD computer with its supporting software programs 132,134 operates to create a three-dimensional image 136 of a desired object or model and to convert the image into multiple elevation layer data 142 (a plurality of segments). Specifically, the image 136 of a three-dimensional object is converted into a proper format 138 utilizing commercially available CAD/Solid Modeling software 132,134. A commonly used format is the stereo lithography file (.STL), which has become a defacto industry standard for rapid prototyping. The object image data are then sectioned into multiple layers by a commercially available software program 140. Each layer has its own shape and dimensions. These layers with each layer being composed of a plurality of segments, when combined together, will reproduce the complete shape of the intended object. These segment data are then converted into programmed signals (data for selecting tools, generating tool paths, and regulating valves, etc.) in a proper format, such as the standard NC G-codes 144 commonly used in computerized numerical control (CNC) machining industry. These layering data signals may be sent to a machine controller 150 which selectively actuates the motors for displacing the dispensing nozzle/object-supporting platform 152, activating material feeding valves 154,156, and operating optional temperature controllers 158. Available software packages for computer-aided machine control include FLASHCUT CNC from FlashCut CNC, Inc. (1263 El Camino Real, Suite W, Menlo Park, Calif. 94025) and EUCLID MACHINIST from MATRA Datavision (1 Tech Drive, Andover, Mass. 01810).

Numerous software programs have become available that are capable of performing the presently specified functions. Suppliers of CAD/Solid Modeling software packages for converting CAD drawings into .STL format include SDRC (Structural Dynamics Research Corp. 2000 Eastman Drive, Milford, Ohio 45150), Cimatron Technologies (3190 Harvester Road, Suite 200, Burlington, Ontario L7N 3N8, Canada), Parametric Technology Corp. (128 Technology Drive, Waltham, Mass. 02154), and Solid Works (150 Baker Ave. Ext., Concord, Mass. 01742). Optional software packages 160 may be utilized to check and repair .STL files which are known to often have gaps, defects, etc. AUTOLISP can be used to convert AUTOCAD drawings into multiple layers of specific patterns and dimensions. NC Polaris, Smartcam, and Mastercam are also available for performing slicing tasks.

Several software packages specifically written for rapid prototyping have become commercially available. These include (1) SOLIDVIEW RP/MASTER software from Solid Concepts, Inc., Valencia, Caslif.; (2) MAGICS RP software from Materialise, Inc., Belgium; and (3) RAPID PROTOTYPING MODULE (RPM) software from Imageware, Ann Arbor, Mich. These packages are capable of accepting, checking, repairing, displaying, and slicing .STL files for use in a solid freeform fabrication system. These and other software packages 164 (e.g. Bridgeworks from Solid Concepts, Inc.) are also available for identifying an un-supported feature in the object and for generating data files 166 that can be used to build a support structure for the un-supported feature. The support structure may be built by a separate fabrication tool or the same nozzle that is used to build the object.

A company named CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MIU) 162, etc. These digitizing techniques are known in the art. The digitized data may be re-constructed to form a 3-D model by using proper solid modeling software 134 with a reverse engineering capability on the computer and then converted to .STL files. The computer with the supporting software programs may operate to accept the date files previously created in a different computer, yet preferably already in .STL format.

The three-dimensional motion controller 150 is electronically linked to the mechanical drive means (motion devices) and is operative to actuate the mechanical drive means in response to "X," "Y," "Z" axis drive signals for each layer received from the CAD computer. Controllers that are capable of driving linear motion devices are commonplace, as discussed earlier. Examples include those commonly used in a milling machine.

Another embodiment of the present invention is a solid freeform fabrication process for building a colorful three-dimensional object comprising the steps of (1) providing a supply of at least one primary body-building material in filament form; (2) feeding the at least one filament material to enter one end of a flow passage of a dispensing nozzle having a discharge orifice on another end; (3) operating a multi-channel colorant-injecting module to inject a first colorant-containing material into the flow passage through a pipe disposed in close proximity to the discharge orifice; (4) operating the dispensing nozzle to convert a leading portion of the filament material therein to a flowable fluid which mixes with the first colorant-containing material for forming a first colorant-containing fluid, and to dispense the colored fluid through the discharge orifice to an object-supporting platform; and (5) during this dispensing step, moving the nozzle and the platform relative to one another in an X-Y plane defined by an X- and Y-directions and in a Z-direction orthogonal to the X-Y plane to form the colored fluid into a three-dimensional object.

Preferably the above moving step includes the steps of (A) moving the nozzle and the platform relative to one another in a direction parallel to the X-Y plane to form a first layer of the first colorant-containing material on the platform; (B) moving the nozzle and the platform away from one another in the Z-direction by a predetermined layer thickness; and (C) after the portion of the first layer adjacent to the nozzle has solidified, dispensing a second layer of the first colorant-containing fluid onto the first layer while simultaneously moving the platform and the nozzle relative to one another in a direction parallel to the X-Y plane, whereby the second layer solidifies and adheres to the first layer. Preferably, this procedure is followed by additional steps of forming multiple layers of the first colorant-containing material on top of one another by repeated dispensing of the material from the nozzle as the platform and said nozzle are moved relative to one another in the direction parallel to the X-Y plane, with the nozzle and the platform being moved away from one another in the Z direction by the predetermined layer thickness after each preceding layer has been formed, and with the dispensing of each successive layer being controlled to take place after the material in the preceding layer immediately adjacent the nozzle has solidified. This process can be used to make a single-color object. These steps can be accomplished by operating the apparatus described above either manually or under the control of a computer system.

Another embodiment is a process comprising the above five steps, (1) through (5), wherein the moving step includes the steps of (D) moving the nozzle and the platform relative to one another in a direction parallel to the X-Y plane to form first portion of a first layer with the first colorant-containing material on the platform, injecting a second colorant-containing material into the flow passage of the nozzle to mix with the leading portion of the filament material to form a second color fluid, and dispensing the second color fluid to form a second portion of the first layer; these procedures being repeated until a multi-color first layer is built; (E) moving the nozzle and the platform away from one another in the Z direction by a predetermined layer thickness and after the portion of the first layer adjacent the nozzle has solidified, dispensing a second layer of colored fluids onto the first layer while simultaneously moving the platform and the nozzle relative to one another in a direction parallel to the X-Y plane, whereby the second layer solidifies and adheres to the first layer; and (F) forming multiple layers of colored materials on top of one another by repeated dispensing of colored fluids, in a fashion that one color fluid is dispensed for a portion of a layer, from the nozzle as the platform and the nozzle are moved relative to one another in the direction parallel to the X-Y plane, with the nozzle and the platform being moved away from one another in the Z direction by the predetermined layer thickness after each preceding layer has been formed, and with the dispensing of each successive layer being controlled to take place after the materials in the preceding layer immediately adjacent the nozzle has solidified. This process can be employed to make a multi-color object in which each layer may be composed of several portions of different colors and different layers may have different color patterns.

Another embodiment is a process comprising the above five steps, (1) through (5), wherein the moving step includes the steps of (G) moving the nozzle and the platform relative to one another in a direction parallel to the X-Y plane to form a first layer of the first colorant-containing material on the platform; (H) moving the nozzle and the platform away from one another by a predetermined layer thickness and after the portion of the first layer adjacent to the nozzle has solidified, injecting a second colorant-containing material into the flow passage of the nozzle to mix with the leading portion of the filament material to form a second color fluid, and dispensing the second color fluid to form a second layer onto the first layer while simultaneously moving the platform and the nozzle relative to one another in a direction parallel to the X-Y plane, whereby the second layer solidifies and adheres to the first layer; and (I) forming multiple layers of colorant-containing materials on top of one another by repeated dispensing of colored materials, one colorant-containing material for one layer, from the nozzle as the platform and the nozzle are moved relative to one another in a direction parallel to the plane, with the nozzle and the platform being moved away from one another in the Z direction by the predetermined layer thickness after each preceding layer has been formed, and with the dispensing of each successive layer being controlled to take place after the material in the preceding layer immediately adjacent the nozzle has solidified. This process can be utilized to fabricate a multi-color object in which individual layers could have different colors but each layer is of one single color.

The above-described processes may be controlled by a computer system. This can be accomplished by taking, for instance, the following additional steps: (J) creating an image of the three-dimensional object on a computer with the image including a plurality of segments defining the object; (K) generating programmed signals corresponding to each of these segments in a predetermined sequence; and (L) moving the nozzle and the platform relative to one another in response to these programmed signals. These additional steps provide computerized control over the relative motions between the nozzle and the platform to build a 3-D object. However, the adjustments of color patterns in an object can be made manually during any stage of the object-building process. This can be done by manually adjusting the valves controlling the feed rates of the colorant-feeding channels.

If, instead, a predetermined color pattern is desired before the object building process begins, then this pattern may be defined by attaching a color code (corresponding to one colorant or a selected proportion of colorants) to each of the constituent segments defining the object. When the computer reads a specific code, during the object building process, it will send out proper control signals to the valves of individual channels for adjusting the feed rates of different colorants. This will make it possible to build different portions of a layer with different colors and different layers of an object with different color patterns. Therefore, a preferred embodiment of the presently invented process is one including (1) through (5) and (G) through (L); however, in Step (J), each segment corresponding to one portion of a layer is coded with a color and the color code is inserted as a part of the programmed signals. These signals will be used to operate and control the multi-channel colorant-feeding module and the nozzle to dispense selected colored fluids with one fluid of a desired color being dispensed for each of the segments.

As indicated earlier, the most popular file format used by all commercial rapid prototyping machines is the .STL format. The .STL file format describes a CAD model's surface topology as a single surface represented by triangular facets. By slicing through the CAD model simulated by these triangles, one would obtain coordinate points that define the boundaries of each cross section. It is therefore convenient for a dispensing nozzle to follow these coordinate points to trace out the perimeters of a layer cross section. These perimeters may be built with a proper color pattern and, since the exterior colors are normally what a person sees, the color patterns of the perimeters of constituent layer cross sections are normally more important than those of the interior of an object. These considerations have led to the development of another embodiment of the present invention. This is a process as specified in steps (1) through (5), wherein the moving step includes the step of moving the dispensing nozzle and the platform relative to one another in a direction parallel to the X-Y plane according to a first predetermined pattern to form an outer boundary from at least one selected color fluid on the platform with the outer boundary defining an exterior surface of the object. Since this outer boundary defines an interior space in the object, this moving step may further include the step of moving the dispensing nozzle and the platform relative to one another in a direction parallel to the X-Y plane according to at least one other predetermined pattern to fill this interior space with at least one of the color fluids. The interior does not have to have the same color as the exterior boundary.

The above procedures of delineating a boundary of a cross section and filling in the interior space of the cross section may be automated by using a computer system. This can be achieved by taking the following steps: (j) creating an image of the object on a computer with the image including a plurality of segments defining the object; (k) generating program signals corresponding to each of the segments in a predetermined sequence; (l) providing at least two colorant-containing compositions and feeding the compositions to a dispensing apparatus and, during this feeding step, providing means for adjusting the feed proportions of these compositions; (m) dispensing these compositions in a flowable fluid state from the dispensing apparatus onto an object-supporting platform; and (n) during this dispensing step, moving the dispensing apparatus and the object-supporting platform in response to the programmed signals relative to one another in the X-Y plane and in the Z-direction in a predetermined sequence of movements such that the compositions are dispensed in free space as a plurality of segments sequentially formed so that the last dispensed segment overlies at least a portion of the preceding segment in contact therewith to thereby form the object.

In the above-cited processes, there may be provided at least three compositions containing yellow, blue, and red colorants, respectively. Alternatively, there may be provided at least two compositions containing black and white colorants, respectively.

As preferred embodiments of this invention, each one of the above computer-controlled processes also includes the steps of identifying any un-supported feature of an object, such as an isolated island or an overhang, creating layer data files for a support structure, and generating necessary programmed signals with which the same nozzle or a separate fabrication tool can be used to build the support structure.

Another preferred embodiment of the present invention is a process for making a colorful three-dimensional object as defined in any of the above-described processes, yet with the following additional specifications: (p) the discharge orifice tip of the nozzle has a substantially planar bottom surface being maintained at a predetermined gap distance from the base member, (q) the planar bottom surface of the tip is maintained substantially parallel to both the first layer and the plane of the base member while a second layer of materials is being deposited onto the first layer from the orifice. These two requirements are specified so that the planar bottom surface of the orifice tip provides a shearing effect on the top surface of the second layer to thus closely control the absolute location of successive layers with respect to the base member. The orifice acts essentially like a "doctor's blade". This action also serves to avoid any accumulative error in layer build-up, and to maintain a smooth layer surface.

What is claimed:

1. Apparatus for making a colorful three-dimensional object on a layer-by-layer basis, comprising:

a supply of at least one primary body-building material in filament form;

a filament feeding device comprising at least one filament feeding channel at a predetermined distance from said supply for receiving said at least one body-building filament material therefrom and drive means to drive and regulate the flow of said at least one filament material in said feeding channel;

a dispensing nozzle having on one side a flow passage communicating with each said channel to receive said filament material therefrom, heating means at a predetermined position for supplying heat energy to said flow passage for converting a leading portion of said filament material therein to a flowable fluid state, and on another side a discharge orifice to dispense said fluid therethrough;

a multi-channel colorant-injecting module comprising at least one injecting channel in flow communication with said flow passage of the nozzle, at least one colorant-containing reservoir in flow communication with said injecting channel, and valve means in control relation to said at least one reservoir to regulate the flow of a colorant therefrom and through said injecting channel to mix with said leading portion of said filament material for forming a colorant-containing fluid;

an object-supporting platform disposed at an initially predetermined distance from said discharge orifice to receive said colorant-containing fluid discharged therefrom; and motion devices coupled to said platform and said nozzle for moving said nozzle and said platform relative to one another in a plane defined by first and second directions and in a third direction orthogonal to said plane to deposit said colorant-containing fluid into a three-dimensional object.

2. Apparatus for making a colorful three-dimensional object on a layer-by-layer basis, comprising:

a supply of at least one primary body-building material in filament form;

a filament feeding device comprising at least one filament feeding channel at a predetermined distance from said supply for receiving said at least one body-building material therefrom and drive means to drive and regulate the flow of said at least one filament material in said feeding channel;

a dispensing nozzle having on one side a flow passage communicating with each said channel to receive said filament material therefrom, liquid-supplying means having a pipe in fluid communication with said flow passage, and on another side a discharge orifice; said liquid-supplying means further comprising a liquid reservoir and valve means in control relation to said reservoir to regulate the flow of a carrier liquid therefrom into said pipe; said carrier liquid being supplied for mixing with a leading portion of said filament material in said flow passage to form a flowable fluid which is then discharged through said orifice;

a multi-channel colorant-injecting module comprising at least one injecting channel in flow communication with said flow passage of the nozzle, at least one reservoir containing a colorant and being in flow communication with said injecting channel, and valve means in control relation to said at least one reservoir to regulate the flow of a colorant therefrom and through said injecting channel to mix with said leading portion of said filament material for forming a colorant-containing fluid;

an object-supporting platform disposed at a predetermined initial distance from said discharge orifice to receive said colorant-containing fluid discharged therefrom; and motion devices coupled to said platform and said nozzle for moving said nozzle and said platform relative to one another in a plane defined by first and second directions and in a third direction orthogonal to said plane to deposit said colorant-containing fluid into a three-dimensional object.

3. Apparatus as set forth in claim 1 or claim 2, wherein said drive means comprise roller means, motor means to drive said roller means, and control means electronically connected to said motor means.

4. Apparatus as set forth in claim 1 or claim 2, further comprising:
   a computer-aided design computer and supporting software programs operative to create a three-dimensional image of a desired object, to convert said image into a plurality of segments defining the object, and to generate programmed signals corresponding to each of said segments in a predetermined sequence; and
   a three-dimensional motion controller electronically linked to said motion devices and operative to actuate said motion devices in response to said programmed signals for each said segment received from said computer.

5. Apparatus as set forth in claim 1 or claim 2, further comprising:
   a computer-aided design computer and supporting software programs operative to accept previously created solid modeling data files representing a plurality of segments defining a desired object, and to generate programmed signals corresponding to each of said segments in a predetermined sequence; and
   a three-dimensional motion controller electronically linked to said movement devices and operative to actuate said movement devices in response to said programmed signals for each said segment received from said computer.

6. Apparatus as set forth in claim 5, wherein said supporting software programs comprise:
   means for evaluating said data files of the object to locate any un-supported feature of the object;
   means, responsive to the evaluating means locating an un-supported feature, for defining a support structure for the un-supported feature;
   means for creating a plurality of segments defining said support structure; and
   means for generating programmed signals required by said dispensing nozzle to fabricate said support structure.

7. Apparatus as set forth in claim 5, further comprising a separate fabrication tool and wherein said supporting software programs comprise:
   means for evaluating said data files of the object to locate any un-supported feature of the object;
   means, responsive to the evaluating means locating an un-supported feature, for defining a support structure for the un-supported feature;
   means for creating a plurality of segments defining said support structure; and
   means for generating programmed signals required by said separate fabrication tool to fabricate said support structure;
   said separate fabrication tool comprising dispensing means for depositing a low-melting material.

8. Apparatus as set forth in claim 1, wherein said supply of filament comprises a rotatable spool on which said filament is wound.

9. A solid freeform fabrication process for building a colorful three-dimensional object comprising the steps of:
   providing a supply of at least one primary body-building material in filament form;
   feeding said at least one filament material to enter one end of a flow passage of a dispensing nozzle having a discharge orifice on another end;
   operating a multi-channel colorant-injecting module to inject a first colorant-containing material into said flow passage through a pipe in flow communication with said discharge orifice;
   operating said dispensing nozzle to convert a leading portion of said filament material therein to a flowable fluid which mixes with said first colorant-containing material for forming a first colorant-containing fluid, and to dispense said colored fluid through said discharge orifice to an object-supporting platform; and
   during said dispensing step, moving said nozzle and said platform relative to one another in a plane defined by first and second directions and in a third direction orthogonal to said plane to form said colored fluid into a three-dimensional object.

10. A process as set forth in claim 9, wherein said moving step includes the steps of:
    moving said nozzle and said platform relative to one another in a direction parallel to said plane to form a first layer of said first colorant-containing material on said platform;
    moving said nozzle and said platform away from one another in said third direction by a predetermined layer thickness; and
    after the portion of said first layer adjacent to said nozzle has solidified, dispensing a second layer of said first colorant-containing fluid onto said first layer while simultaneously moving said platform and said nozzle relative to one another in said direction parallel to said plane, whereby said second layer solidifies and adheres to said first layer.

11. A process as set forth in claim 10, further comprising additional steps of:
    forming multiple layers of said first colorant-containing material on top of one another by repeated dispensing of said material from said nozzle as said platform and said nozzle are moved relative to one another in said direction parallel to said plane, with said nozzle and said platform being moved away from one another in said third direction by said predetermined layer thickness after each preceding layer has been formed, and with the dispensing of each successive layer being controlled to take place after said material in the preceding layer immediately adjacent said nozzle has solidified.

12. A process as set forth in claim 9, wherein said moving step includes the steps of:
    moving said nozzle and said platform relative to one another in a direction parallel to said plane to form first portion of a first layer with said first colorant-containing material on said platform, injecting a second colorant-containing material into said flow passage of the nozzle to mix with a leading portion of said filament material to form a second color fluid, and dispensing said second color fluid to form a second portion of said first layer; these procedures being repeated until a multi-color first layer is built;
    moving said nozzle and said platform away from one another by a predetermined layer thickness; and
    after the portion of said first layer adjacent to said nozzle has solidified, dispensing a second layer of said colored fluids onto said first layer while simultaneously moving said platform and said nozzle relative to one another in said direction parallel to said plane, whereby said second layer solidifies and adheres to said first layer;

forming multiple layers of said colored materials on top of one another by repeated dispensing of said colored fluids, in such a fashion that one color fluid is dispensed for a portion of a layer, from said nozzle as said platform and said nozzle are moved relative to one another in said direction parallel to said plane, with said nozzle and said platform being moved away from one another in said third direction by said predetermined layer thickness after each preceding layer has been formed, and with the dispensing of each successive layer being controlled to take place after said materials in the preceding layer immediately adjacent said nozzle has solidified.

13. A process as set forth in claim 9, wherein said moving step includes the steps of:

moving said nozzle and said platform relative to one another in a direction parallel to said plane to form a first layer of said first colorant-containing material on said platform;

moving said nozzle and said platform away from one another by a predetermined layer thickness; and after the portion of said first layer adjacent to said nozzle has solidified, injecting a second colorant-containing material into said flow passage of the nozzle to mix with a leading portion of said filament material to form a second color fluid, and dispensing said second color fluid to form a second layer onto said first layer while simultaneously moving said platform and said nozzle relative to one another in said direction parallel to said plane, whereby said second layer solidifies and adheres to said first layer;

forming multiple layers of colorant-containing materials on top of one another by repeated dispensing of said materials, in such a fashion that one colorant-containing material is dispensed for one layer, from said nozzle as said platform and said nozzle are moved relative to one another in said direction parallel to said plane, with said nozzle and said platform being moved away from one another in said third direction by said predetermined layer thickness after each preceding layer has been formed, and with the dispensing of each successive layer being controlled to take place after said material in the preceding layer immediately adjacent said nozzle has solidified.

14. A process as set forth in claim 9, further comprising the steps of:

creating an image of said three-dimensional object on a computer with said image including a plurality of segments defining the object;

generating programmed signals corresponding to each of said segments in a predetermined sequence; and moving said nozzle and said platform relative to one another in response to said programmed signals.

15. A process as set forth in claim 12, further comprising the steps of:

creating an image of said three-dimensional object on a computer with said image including a plurality of segments defining the object; each said segment being corresponding to one portion of a layer and being coded with a color;

generating programmed signals corresponding to each of said segments in a predetermined sequence;

operating said multi-channel colorant-feeding module and said nozzle, in response to said programmed signals, to dispense said colored fluids through said orifice with one color fluid being dispensed for each of said segments; and during said dispensing steps, moving said nozzle and said platform relative to one another in response to said programmed signals to form said object of multiple colors.

16. A process as set forth in claim 9, wherein said moving step includes the step of moving said dispensing nozzle and said platform relative to one another in a direction parallel to said plane according to a first predetermined pattern to form an outer boundary from at least one of said color fluids on said platform, said outer boundary defining an exterior surface of said object.

17. A process as set forth in claim 16, wherein said outer boundary defines an interior space in said object, and said moving step further includes the step of moving said dispensing nozzle and said platform relative to one another in said direction parallel to said plane according to at least one other predetermined pattern to fill said interior space with at least one of said color fluids.

18. A process as set forth in claim 16, further comprising the steps of:

creating an image of said three-dimensional object on a computer, said image including a plurality of segments defining said object; and generating program signals corresponding to each of said segments in a predetermined sequence, wherein said program signals determine said movement of said nozzle and said platform relative to one another in said first predetermined pattern and said at least one other predetermined pattern.

19. A process for making a colorful three-dimensional object, comprising the steps of:

creating an image of said three-dimensional object on a computer, said image including a plurality of segments defining said object and each of said segments being corresponding to one portion of a layer and being coded with a color;

generating program signals corresponding to each of said segments in a predetermined sequence;

providing at least one primary body-building material, delivered in a generally elongate rod form;

feeding said at least one elongate rod material to enter one end of a flow passage of a dispensing nozzle having a discharge orifice on another end;

operating a multi-channel colorant-injecting module to inject colorant-containing materials, one colorant-containing material at a time for each of said portions of a layer, into said flow passage through a pipe in flow communication with said discharge orifice;

operating said dispensing nozzle to convert a leading portion of said rod material therein to a flowable fluid which mixes with said colorant-containing materials one colorant at a time for forming colorant-containing fluids, and to dispense said colored fluids through said discharge orifice to an object-supporting platform; and during said dispensing step, moving said dispensing nozzle and said object-supporting platform in response to said programmed signals relative to one another in a plane defined by first and second directions and in a third direction orthogonal to said plane in a predetermined sequence of movements such that said colorant-containing fluids are dispensed in free space as a plurality of segments sequentially formed so that the last dispensed segment overlies at least a portion of the preceding segment in contact therewith to thereby form said three-dimensional object of multiple colors.

20. A process as set forth in claim 19, wherein there are provided at least three colorant-containing materials containing yellow, blue, and red colorants, respectively.

21. A process as set forth in claim 19, wherein there are provided at least two colorant-containing materials containing black and white colorants, respectively.

22. A process for making a colorful three-dimensional object, comprising the steps of:

creating an image of said three-dimensional object on a computer, said image including a plurality of segments defining said object;

evaluating the data files representing said object to locate any un-supported feature of the object, followed by defining a support structure for the un-supported feature and creating a plurality of segments defining said support structure;

generating program signals corresponding to each of said segments for both said object and said support structure in a predetermined sequence;

providing at least one primary body-building material delivered in a generally elongate rod form;

feeding said at least one elongate rod material to enter one end of a flow passage of a dispensing nozzle having a discharge orifice on another end;

operating a multi-channel colorant-injecting module to inject colorant-containing materials, one colorant-containing material at a time for each of said portions of a layer, into said flow passage through a pipe in flow communication with said discharge orifice;

operating said dispensing nozzle to convert a leading portion of said at least one body-building elongate rod material therein to a flowable fluid which mixes with said colorant-containing materials one colorant at a time for forming colorant-containing fluids, and to dispense said colored fluids through said discharge orifice to an object-supporting platform; and during said dispensing step, moving said dispensing nozzle and said object-supporting platform in response to said programmed signals relative to one another in a plane defined by first and second directions and in a third direction orthogonal to said plane in a predetermined sequence of movements such that said colored fluids are dispensed in free space as a plurality of segments sequentially formed so that the last dispensed segment overlies at least a portion of the preceding segment in contact therewith to thereby form said support structure and said three-dimensional object of multiple colors.

23. Apparatus as set forth in claim 1, wherein said discharge orifice has a bottom surface positioned by said motion devices in contact with the material being discharged as said nozzle and said platform move relative to each other in the course of forming each layer to assist in controlling layer thickness.

* * * * *